(12) United States Patent
Reitz et al.

(10) Patent No.: US 9,376,955 B2
(45) Date of Patent: Jun. 28, 2016

(54) ENGINE COMBUSTION CONTROL VIA FUEL REACTIVITY STRATIFICATION

(71) Applicant: WISCONSIN ALUMNI RESEARCH FOUNDATION, Madison, WI (US)

(72) Inventors: Rolf Deneys Reitz, Madison, WI (US);
Reed M. Hanson, Madison, WI (US);
Derek A. Splitter, Madison, WI (US);
Sage L. Kokjohn, Fitchburg, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 14/748,730

(22) Filed: Jun. 24, 2015

(65) Prior Publication Data
US 2015/0292391 A1 Oct. 15, 2015

Related U.S. Application Data

(63) Continuation of application No. 14/108,868, filed on Dec. 17, 2013, now Pat. No. 9,080,501, which is a continuation of application No. 12/703,808, filed on Feb. 11, 2010, now Pat. No. 8,616,177.

(51) Int. Cl.
*F02B 1/12* (2006.01)
*F02D 41/30* (2006.01)
(Continued)

(52) U.S. Cl.
CPC ............... *F02B 17/005* (2013.01); *F02B 1/12* (2013.01); *F02B 23/06* (2013.01);
(Continued)

(58) Field of Classification Search
CPC . F02D 41/30; F02D 41/3023; F02D 41/3035; F02D 41/3052; F02D 43/00; F02B 1/12; F02B 3/06; F02B 15/00; F02B 17/00

USPC ............... 123/1 A, 295, 298–300, 304, 525, 123/575–577; 701/103–105
See application file for complete search history.

(56) References Cited

U.S. PATENT DOCUMENTS

| 673,160 A | 4/1901 | Diesel |
| 2,767,691 A | 10/1956 | Mengelkamp et al. |

(Continued)

FOREIGN PATENT DOCUMENTS

| DE | 1236874 | 6/1971 |
| DE | 29529290 | 1/1997 |

(Continued)

OTHER PUBLICATIONS

Clean Air Power Duel Fuel Press Release, 2007.
(Continued)

*Primary Examiner* — John Kwon
*Assistant Examiner* — Johnny H Hoang
(74) *Attorney, Agent, or Firm* — Craig A. Fieschko, Esq.; DeWitt Ross & Steven S.C.

(57) ABSTRACT

A compression ignition engine uses two or more fuel charges having two or more reactivities to control the timing and duration of combustion. In a preferred implementation, a lower-reactivity fuel charge is injected or otherwise introduced into the combustion chamber, preferably sufficiently early that it becomes at least substantially homogeneously dispersed within the chamber before a subsequent injection is made. One or more subsequent injections of higher-reactivity fuel charges are then made, and these preferably distribute the higher-reactivity matter within the lower-reactivity chamber space such that combustion begins in the higher-reactivity regions, and with the lower-reactivity regions following thereafter. By appropriately choosing the reactivities of the charges, their relative amounts, and their timing, combustion can be tailored to achieve optimal power output (and thus fuel efficiency), at controlled temperatures (and thus controlled NOx), and with controlled equivalence ratios (and thus controlled soot).

45 Claims, 3 Drawing Sheets

(51) Int. Cl.
| | |
|---|---|
| *F02B 17/00* | (2006.01) |
| *F02B 23/06* | (2006.01) |
| *F02D 19/08* | (2006.01) |
| *F02D 41/00* | (2006.01) |
| *F02D 19/06* | (2006.01) |
| *F02D 41/40* | (2006.01) |

(52) U.S. Cl.
CPC ........ *F02B 23/0669* (2013.01); *F02B 23/0672* (2013.01); *F02D 19/061* (2013.01); *F02D 19/0649* (2013.01); *F02D 19/0689* (2013.01); *F02D 19/081* (2013.01); *F02D 41/0025* (2013.01); *F02D 41/3047* (2013.01); *F02B 2275/14* (2013.01); *F02D 19/0692* (2013.01); *F02D 41/402* (2013.01); *Y02T 10/123* (2013.01); *Y02T 10/125* (2013.01); *Y02T 10/36* (2013.01)

(56) References Cited

U.S. PATENT DOCUMENTS

| | | | |
|---|---|---|---|
| 2,988,065 A | 6/1961 | Wankel et al. | |
| 4,656,984 A | 4/1987 | Southard | |
| 5,094,204 A | 3/1992 | King | |
| 5,315,973 A | 5/1994 | Hill et al. | |
| 6,164,263 A | 12/2000 | Saint-Hilaire et al. | |
| 6,244,241 B1 | 6/2001 | Mamiya et al. | |
| 6,244,243 B1 | 6/2001 | Mamiya et al. | |
| 6,516,774 B2 | 2/2003 | Zur Loye et al. | |
| 6,526,939 B2 | 3/2003 | Reitz et al. | |
| 6,561,157 B2 | 5/2003 | Zur Loye et al. | |
| 6,598,584 B2 | 7/2003 | Beck et al. | |
| 6,659,065 B1 | 12/2003 | Renegar | |
| 6,668,789 B1 | 12/2003 | Marriott et al. | |
| 6,675,748 B2 | 1/2004 | Ancimer et al. | |
| 6,722,321 B2 | 4/2004 | Kim | |
| 6,725,827 B2 | 4/2004 | Ueda et al. | |
| 6,736,106 B2 | 5/2004 | Reitz et al. | |
| 6,813,880 B2 | 11/2004 | Nishiyama et al. | |
| 6,892,692 B2 | 5/2005 | Barrett | |
| 6,983,729 B2 | 1/2006 | Schapiro et al. | |
| 7,036,482 B2 | 5/2006 | Beck et al. | |
| 7,121,254 B2 | 10/2006 | Wickman et al. | |
| 7,128,046 B1 | 10/2006 | Dec et al. | |
| 7,178,502 B2 | 2/2007 | Okulov | |
| 7,284,506 B1 | 10/2007 | Sun et al. | |
| 7,337,763 B2 | 3/2008 | Reitz et al. | |
| 7,367,309 B2 | 5/2008 | Hashimoto et al. | |
| 7,409,926 B2 | 8/2008 | Sun et al. | |
| 7,431,010 B2 | 10/2008 | Juretzka et al. | |
| 7,444,986 B2 | 11/2008 | Shute | |
| 7,461,628 B2 | 12/2008 | Blumberg et al. | |
| 7,464,690 B1 | 12/2008 | Reitz et al. | |
| 7,487,766 B2 | 2/2009 | Alger et al. | |
| 7,712,451 B2 | 5/2010 | Hung et al. | |
| 7,721,703 B2 | 5/2010 | Kakuho et al. | |
| 7,771,675 B2 | 8/2010 | Hotta et al. | |
| 7,866,148 B2 | 1/2011 | O'Neill | |
| 7,913,663 B2 | 3/2011 | Cobbs | |
| 2003/0187565 A1 | 10/2003 | Wong | |
| 2006/0180099 A1 | 8/2006 | Aimoto et al. | |
| 2006/0225694 A1* | 10/2006 | Brachert | F02D 13/0265 123/295 |
| 2007/0137611 A1* | 6/2007 | Yu | F02D 41/3047 123/304 |
| 2007/0169742 A1 | 7/2007 | Brachert et al. | |
| 2007/0209633 A1* | 9/2007 | Brachert | F02B 47/08 123/295 |
| 2007/0256648 A1 | 11/2007 | Sun et al. | |
| 2008/0017136 A1 | 1/2008 | Sciamanna et al. | |
| 2008/0053408 A1 | 3/2008 | Futonagane et al. | |
| 2009/0165759 A1 | 7/2009 | Sengupta et al. | |
| 2010/0258097 A1 | 10/2010 | Takahashi et al. | |
| 2010/0269782 A1 | 10/2010 | Minick et al. | |
| 2011/0192367 A1 | 8/2011 | Reitz et al. | |

FOREIGN PATENT DOCUMENTS

| | | |
|---|---|---|
| DE | 102012002425 A1 | 8/2013 |
| EP | 1918554 A1 | 5/2008 |
| EP | 1975394 A2 | 10/2008 |
| GB | 1439446 | 6/1976 |
| JP | 58-042584 | 4/1977 |
| JP | 1151722 | 6/1989 |
| JP | 01216026 | 8/1989 |
| JP | 63159614 | 1/1990 |
| JP | 02241977 | 9/1990 |
| JP | 05163955 | 6/1993 |
| JP | 09-158810 A | 6/1997 |
| JP | 2000-179368 | 6/2000 |
| JP | 2003-53289 | 11/2003 |
| JP | 2005-139945 A | 6/2005 |
| JP | 200732402 | 2/2007 |
| JP | 2007-85295 | 4/2007 |
| JP | 2007-231937 | 9/2007 |
| JP | 2007-303403 A | 11/2007 |
| JP | 2009-138609 | 6/2009 |
| JP | 2009-287482 | 12/2009 |
| JP | 2010-502820 | 1/2010 |
| JP | 2011-58400 | 3/2011 |
| WO | WO 9504876 A1 | 2/1995 |
| WO | WO 01/86128 A2 | 11/2001 |
| WO | WO 2004/113705 A1 | 12/2004 |
| WO | WO 2007/115594 A1 | 10/2007 |
| WO | WO 2009/064028 A1 | 5/2009 |

OTHER PUBLICATIONS

Clean Air Power Duel Fuel Press Release, 2009.

Curran, S., Prikhodko, V., Wagner, R., Cho, K., Sluder, C., Kokjohn, S., and Reitz, R.D., "In-Cylinder Fuel Blending of Gasoline/Diesel for Improved Efficiency and Lowest Possible Emissions on a Multi-Cylinder Engine," SAE Paper 2010-01-2206, 2010.

Hanson, R., Reitz, R.D., Splitter, D., and Kokjohn, S., "An Experimental Investigation of Fuel Reactivity Controlled PCCI Combustion in a Heavy-Duty Engine," SAE paper 2010-01-0864, 2010.

Hanson, R.M., Kokjohn, S.L., Splitter, D.A., and Reitz, R.D., "Fuel Effects on Reactivity Controlled Compression Ignition (RCCI) Combustion at Low Load," SAE Paper 2011-01-0361, 2011.

Inagaki et al., "Dual-fuel PCI Combustion Controlled by In-Cylinder Stratification of Ingitability," SAE paper 2006-01-0028, 2006.

Kokjohn, S, Hanson, R., Splitter, D, and Reitz, R.D., "Experiments and Modeling of Dual Fuel HCCI and PCCI Combustion Using In-Cylinder Fuel Blending," SAE paper 2009-01-2647, SAE Int. J. Engines, vol. 2, No. 2, pp. 24-39, 2009.

Kokjohn, S.L. and Reitz, R.D., "A Modeling Study of Charge Preparation in an HCCI Engine Using a Variable Pressure Pulse (VVP) Injection System and Optimized PRF Blends," ICLASS-2009, 11$^{th}$ Triennial International Annual Conference on Liquid Atomization and Spray Systems, Vail, Colorado USA, Jul. 30, 2009.

Kokjohn, S.L., Hanson, R.M., Splitter, D.A., Kaddatz, J., and Reitz, R.D., "Fuel Reactivity Controlled Compression Ignition (RCCI) Combustion in Light- and Heavy-duty Engines," SAE Paper 2011-01-0357, 2011.

Kokjohn, S.L., Hanson, R.M., Splitter, D.A., and Reitz, R.D., "Fuel Reactivity Controlled Compression Ignition (RCCI): A Pathway to Controlled High-Efficiency Clean Combustion," International Journal of Engine Research, Special Issue on Fuel Efficiency, (in Press) Feb. 2011.

Puduppakkam, K.V., Liang, L., Naik, C.V., Meeks, E., Kokjohn, S.L., and Reitz, R.D., "Use of Detailed Kinetics and Advanced Chemistry-Solution Techniques in CFD to Investigate Dual-Fuel Engine Concepts," SAE paper 2011-01-0895, 2011.

Splitter, D.A., Hanson, R., Kokjohn, S., Rein, K., Sanders, S., and Reitz, R.D., "An Optical Investigation of Ignition Processes in Fuel Reactivity Controlled PCCI Combustion," SAE paper 2010-01-0345, SAE Int. J. Engines, vol. 3, No. 1, pp. 142-162, 2010.

(56) References Cited

OTHER PUBLICATIONS

Splitter, D.A., Hanson, R., and Reitz, R.D., "High Efficiency, Low Emissions RCCI Combustion by Use of a Fuel Additive", SAE paper 2010-01-2167, SAE International Journal of Fuels and Lubricants, Dec. 2010 vol. 3 No. 2 742-756.

Splitter, D.A., Hanson, R.M., Kokjohn, S.L., and Reitz, R.D., "Improving engine performance by optimizing fuel reactivity in a dual-fuel PCCI strategy," Thiesel 2010 Conference on Thermo- and Fluid Dynamic Processes in Diesel Engines, Valencia, Spain, Sep. 13-16, 2010.

Splitter, D.A., Hanson, R.M., Kokjohn, S.L., and Reitz, R.D., "Reactivity Controlled Compression Ignition (RCCI) Heavy-Duty Engine Operation at Mid-and High-Loads with Conventional and Alternative Fuels," SAE Paper 2011-01-0363, 2011.

Sun, Y. and Reitz, R.D., "Modeling Diesel Engine NOx and Soot Reduction with Optimized Two-Stage Combustion," SAE paper 2006-01-0027, 2006.

\* cited by examiner

Fig. 4  ▦ 70% Gasoline
        ▦ 80% Gasoline
        ▦ 90% Gasoline
SOI = 40° BTDC  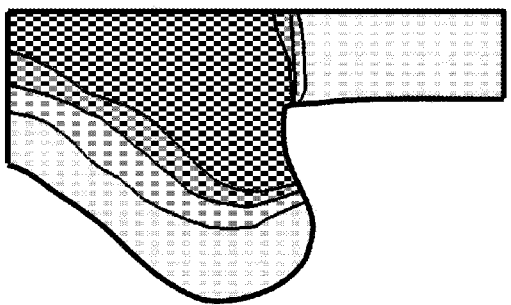
SOI = 60° BTDC  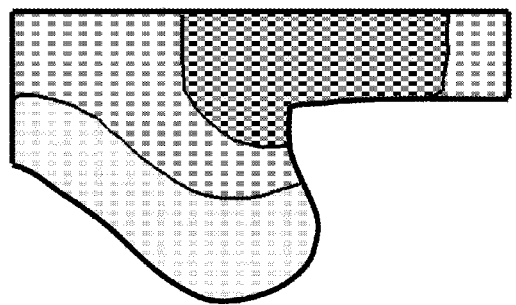

ENGINE COMBUSTION CONTROL VIA FUEL REACTIVITY STRATIFICATION

CROSS-REFERENCE TO RELATED APPLICATIONS

This application is a continuation of U.S. patent application Ser. No. 14/108,868 filed Dec. 17, 2013 (now U.S. Pat. No. 9,080,501), which is in turn a continuation of U.S. patent application Ser. No. 12/703,808 filed Feb. 11, 2010 (now U.S. Pat. No. 8,616,177). These prior applications/patents are incorporated by reference herein.

STATEMENT REGARDING FEDERALLY SPONSORED RESEARCH

This invention was made with United States government support awarded by the following agencies:
U.S. Department of Energy (DOE) Grant No.: DE-FC26-06NT42628
U.S. Department of Energy (DOE) Grant No.: DE-AC04-94AL85000
The United States government has certain rights in this invention.

FIELD OF THE INVENTION

This document concerns an invention relating generally to compression ignition (diesel) engines, and more specifically to combustion optimization methods for diesel engines.

BACKGROUND OF THE INVENTION

Diesel (compression ignition) engines are among the most energy-efficient engines available, with admirably high power output per fuel consumption. Unfortunately, they're also among the "dirtiest" engines available, with common diesel engines (at the time of this document's preparation) being prone to high production of nitrogen oxides (commonly denoted NOx), which result in adverse effects such as smog and acid rain, and particulates (often simply called "soot"), sometimes seen as the black smoke emitted by a diesel vehicle as it accelerates from a stop.

Because of the impact of these emissions on the environment, the United States and many other countries have imposed stringent emissions regulations on the use of diesel engines in vehicles, and numerous technologies have been developed which attempt to reduce diesel emissions. As an example, NOx is generally associated with high-temperature engine conditions, and may therefore be reduced by use of measures such as exhaust gas recirculation (EGR), wherein the engine intake air is diluted with relatively inert exhaust gas (generally after cooling the exhaust gas), thereby reducing the oxygen in the combustion chamber and reducing the maximum combustion temperature. As another example, soot is generally associated with incomplete combustion, and can therefore be reduced by increasing combustion temperatures, or by providing more oxygen to promote oxidation of the soot particles. Unfortunately, measures which reduce NOx production in an engine tend to increase soot production, and measures which reduce soot production in an engine tend to increase NOx production, resulting in what is often termed the "soot-NOx tradeoff."

NOx and soot can also be addressed after they leave the engine (e.g., in the exhaust stream), but such "after-treatment" methods tend to be expensive to install and maintain. As examples, the exhaust stream may be treated with catalysts and/or injections of urea or other reducing/reacting agents to reduce NOx emissions, and/or fuel can periodically be injected and ignited in the exhaust stream to burn off soot collected in "particulate traps." These approaches require considerable expense and complexity, and in the case of particulate traps, they tend to reduce a vehicle's fuel efficiency.

Other technologies have more fundamentally focused on how to reduce both NOx and soot generation from the combustion process and thereby obtain cleaner "engine out" emissions (i.e., emissions directly exiting the engine, prior to exhaust after-treatment or similar measures). These approaches include modifying the timing, rate, and/or shape of fuel injection charges, modifying the combustion chamber shape, and/or modifying other factors to try to attain complete combustion of all fuel (and thus lower soot) while controlling the combustion temperature (thus controlling NOx). Many of these technologies provide emissions improvements, but are difficult to implement and control, particularly over the complete range of speeds and loads over which common diesel vehicle engines must operate. Additionally, many of these technologies still require measures such as exhaust after-treatment to attain emissions targets, leading to the aforementioned issues with cost and fuel efficiency.

Because of the difficulties in complying with emissions regulations while providing the fuel efficiency, cost, and performance that consumers seek, many automotive companies have simply shifted their focus away from diesel engines to the use of gasoline engines. Gasoline engines unfortunately have lower energy efficiency, and their emissions are also of concern. (For the reader having limited familiarity with internal combustion engines, the primary difference between gasoline engines and diesel engines is the manner in which combustion is initiated. Gasoline engines—also commonly referred to as spark ignition or "SI" engines—provide a relatively fuel-rich mixture of air and fuel into an engine cylinder, with a spark then igniting the mixture to drive the piston outwardly from the cylinder to generate work. In diesel engines—also known as compression ignition engines—fuel is introduced into an engine cylinder as the piston compresses the air therein, with the fuel then igniting under the compressed high pressure/high temperature conditions to drive the piston outwardly from the cylinder to generate work.)

Owing to current concerns over fuel/energy supplies, and over the environmental impact of engine emissions, there is a significant need for engines that provide diesel efficiencies (or better) while meeting or exceeding current emissions standards.

SUMMARY OF THE INVENTION

The invention, which is defined by the claims set forth at the end of this document, is directed to engines and engine combustion methods which at least partially alleviate the aforementioned problems. A basic understanding of some of the features of preferred versions of the invention can be attained from a review of the following brief summary of the invention, with more details being provided elsewhere in this document. To assist in the reader's understanding, the following review makes reference to the accompanying drawings (which are briefly reviewed in the "Brief Description of the Drawings" section following this Summary section of this document).

In a diesel (compression ignition) engine, an initial fuel charge having a first reactivity—with the term "reactivity" generally corresponding to cetane number, but being discussed in greater detail elsewhere in this document—is supplied to the combustion chamber during the intake and/or compression stroke, preferably sufficiently early that the initial fuel charge is highly premixed with the air in the combustion chamber during a major portion of the compression stroke. One or more subsequent fuel charges of different reactivity are thereafter supplied to the combustion chamber in such a manner that a stratified distribution of fuel reactivity results within the combustion chamber, with distinct regions of higher and lower fuel reactivity. More specifically, the later different-reactivity charges are timed and otherwise designed to distribute the different-reactivity charges—which will be introduced into a preferably highly premixed "matrix" of air and first-reactivity fuel—in such a manner that the reactivity gradient within the combustion chamber provides a desired combustion start time and rate (a time/rate that results in controlled heat release resulting in superior work input to the piston), while deterring rapid pressure increases and high temperatures (which promote NOx production and reduce fuel economy), and while completely burning all (or nearly all) fuel within the combustion chamber to reduce unburnt hydrocarbons. Combustion tends to begin in one or more regions of highest reactivity (these regions being generated via the introduction of the higher-reactivity material), and spreads therefrom via volumetric energy release and/or flame propagation until all fuel from all charges is consumed. Thus, tailoring of the reactivity distribution within the combustion chamber can allow tailoring of the nature of the combustion process. Greater stratification/gradation in reactivity tends to result in a lower combustion rate. Conversely, lower stratification/gradation in reactivity (greater uniformity in reactivity throughout the combustion chamber) tends to result in a higher combustion rate, since each location within the chamber has an approximately equal chance of igniting first, and those that do not ignite first will be rapidly ignited by their neighbors.

The different fuel charges, with their differing reactivities, can be conventional fuels supplied to the engine from separate conventional tanks, e.g., diesel fuel (which has a higher reactivity) from one tank, and gasoline (which has lower reactivity) from another tank. Alternatively or additionally, fuel from a single tank can have its reactivity modified between higher and lower levels by the addition of an appropriate reactivity modifier. As an example, an initial lower-reactivity charge could simply contain gasoline or diesel fuel, and a subsequent higher-reactivity fuel charge could contain the gasoline or diesel fuel with a small amount of Di-Tertiary Butyl Peroxide (DTBP), 2-ethyl hexyl nitrate, or another cetane improver. An arrangement of this nature is useful since many reactivity modifiers are only needed in very dilute amounts, and thus a smaller tank for containing a reactivity modifier could be provided in a vehicle along with a conventional fuel tank arrangement, and with a metering arrangement that mixes a desired amount of reactivity modifier into the fuel line (or into a high-reactivity fuel line separate from a low-reactivity fuel line) when appropriate. To illustrate, a conventional diesel vehicle with a supplementary 1-2 quart tank containing DTBP would only require refilling every 3000-6000 miles or so, which is roughly the recommended frequency for an oil change, and thus the reactivity modifier tank could be refilled when the vehicle's oil is changed.

To review the reactivity stratification in greater detail, the initial first-reactivity fuel charge is supplied into the combustion chamber sufficiently prior to Top Dead Center (TDC) that the initial fuel charge is at least partially premixed (homogeneously dispersed) within the combustion chamber before the subsequent injection(s) is/are made. The initial charge may be introduced into the combustion chamber via (preferably low-pressure) direct injection into the cylinder, and/or by providing it through the combustion chamber's intake port, as by injecting or otherwise introducing the charge into the intake manifold, and/or into an intake runner extending therefrom. The subsequent fuel charge is preferably supplied into the combustion chamber via direct injection between Bottom Dead Center (BDC or 180 degrees before TDC) and 10 degrees before TDC. More preferably, two or more subsequent fuel charges are supplied to the combustion chamber at different times during this crank angle range. FIGS. 1A-1D schematically illustrate an exemplary preferred arrangement using an initial low-reactivity charge and multiple subsequent high-reactivity charges. Initially, FIG. 1A depicts the combustion chamber near BDC, at the time the intake port is closed, and after a first low-reactivity fuel charge has been introduced (e.g., through the intake port). The low-reactivity fuel is shown highly premixed within the chamber at this time, as is preferred, though such a level of premixing need not necessarily be completed by this time and might not be achieved until later (generally no later than halfway through the compression stroke, i.e., 90 degrees before TDC at most).

A first subsequent high-reactivity fuel charge is then supplied to the combustion chamber during approximately the first half of the compression stroke, preferably between the time the intake port is closed and approximately 40 degrees before TDC. More particularly, for a typical combustion chamber which is partially bounded by a piston face with a central bowl, as depicted in FIGS. 1A-1D, the first subsequent fuel charge is preferably introduced at such a time (and with such pressure) that at least a major portion of the first subsequent fuel charge is directed toward an outer (squish) region located at or near an outer radius of the piston face. More specifically, the first subsequent fuel charge is directed toward a region located outside of an outer third of the radius of the piston face. This is exemplified by FIG. 1B, which shows the combustion chamber at approximately 60 degrees before TDC, and with an injection being directed by the injector toward the squish region. However, in all instances injection is always preferably provided at pressures which avoid or minimize charge impingement on combustion chamber surfaces, since such impingement tends to enhance soot production.

A second subsequent high-reactivity fuel charge is then supplied to the combustion chamber after the first subsequent fuel charge. FIG. 1C depicts such an injection being made at approximately 30 degrees before TDC, with at least a major portion of the injection being directed toward an inner (bowl) region spaced inwardly from the outer radius of the piston face. More specifically, at least a major portion of the second subsequent fuel charge is preferably injected toward a region located inside an outer fourth of the radius of the piston face (i.e., it is injected toward a region defined by the inner 75% of the bore radius). In the meantime, the first subsequent fuel charge has begun to diffuse from the squish region, and to mix with the low-reactivity fuel from the initial fuel charge to form a region of intermediate reactivity at or near the squish region.

FIG. 1D then illustrates the combustion chamber of FIG. 1B at approximately 15 degrees before TDC, with the fuel in the chamber having a reactivity gradient ranging from higher-reactivity regions in the bowl to lower-reactivity regions at the outer diameter of the chamber, and at the crown of the bowl. Combustion may begin around this time, starting at the higher-reactivity region(s) and then propagating to the lower-reactivity regions over time.

Basically the same combustion mechanism results if the reactivities of the charges of FIGS. 1A-1D are reversed, i.e., if one or more initial higher-reactivity charges are followed by one or more subsequent lower-reactivity charges: ignition begins in the higher-reactivity regions and propagates to the lower-reactivity regions. The start and duration of combustion can be controlled by the timings and amounts of the fuel charges, which affect the degree of stratification attained. For optimal work output, it is desirable that the fuel charges are supplied to the combustion chamber to attain peak cylinder pressure at or after Top Dead Center (TDC), more preferably between TDC and 20 degrees ATDC (After TDC), and most preferably between 5 and 15 degrees ATDC. In similar respects, CA50 (i.e., 50% of the total fuel mass burned) preferably occurs between approximately 0 to 10 degrees ATDC. It is also useful to supply the fuel charges in such a manner that the rate of pressure rise is no greater than 10 bar per degree of crank angle rotation, since greater pressure rise can generate unwanted noise and more rapid engine wear, and also promotes higher temperatures (and thus increased fuel consumption owing to heat transfer losses, as well as NOx production).

Use of the foregoing methodology tends to result in much lower peak combustion temperatures—as much as 40% lower—than in conventional diesel engines, owing to the increased control over the combustion process. This deters NOx formation, and additionally increases engine efficiency because less energy loss occurs from the engine through heat transfer. Further, the reactivities, amounts, and timing of the fuel charges can be adapted to optimize combustion such that there is less unburned fuel left at the end of the expansion stroke (and thus lost to the exhaust), thereby also enhancing engine efficiency, and also generating less soot.

An experimental version of the invention operating with diesel and gasoline fuels has resulted in what is believed to be the most fuel-efficient internal combustion engine currently known that is also capable of meeting governmental soot emissions limits, NOx emissions limits, and fuel consumption limits for the year 2010 without the need for exhaust gas after-treatment. As for emissions, the engine can readily attain EPA (U.S. Environmental Protection Agency) standards (as defined on Jan. 1, 2010 at Part 1065 of Title 40 of the United States Code of Federal Regulations), including the EPA's emission standards for the heavy duty transient Federal Test Procedure (FTP) (e.g., NOx emissions of less than 1.0 g/kW-hr and soot emissions of less than 0.1 g/kW-hr). Further reductions in emissions are possible if measures such as exhaust after-treatment are implemented. Looking to indicated thermal efficiency as a measure of fuel efficiency (indicated thermal efficiency being a measure of the amount of fuel converted to output power by the engine, as opposed to being lost via heat transfer, exhaust, or other variables), the engine has demonstrated a net thermal efficiency of up to 53%, and a gross thermal efficiency of about 56%. (Net thermal efficiency takes account of work output over the entire engine cycle, whereas gross thermal efficiency only takes account of the expansion and compression strokes, with an approximately 3% difference between the two being common.) In contrast, at the time of this document's preparation, the average conventional diesel engine has a thermal efficiency of approximately 42%, and the average gasoline engine has a thermal efficiency of approximately 25-30%. The invention can therefore beneficially allow an effective reduction in fuel consumption of approximately 20%, while meeting United States emission standards (at least for the year 2010) without the need for burdensome and expensive engine modifications and/or after-treatment systems for soot and/or NOx reduction. It is of interest to note that while the invention operates using compression ignition (i.e., diesel operating principles), the exceptional efficiency was attained using more gasoline than diesel fuel: gasoline accounted for approximately 75%-90% of the total mass of the fuel provided to the engine (at high loads), with the percentage of gasoline dropping to approximately 50% at low loads. Thus, a diesel engine attained enhanced performance using primarily non-diesel fuel. It is expected that in general, most common engines implementing the invention will use a greater proportion of low reactivity fuel than high reactivity fuel.

Further advantages, features, and objects of the invention will be apparent from the remainder of this document in conjunction with the associated drawings.

BRIEF DESCRIPTION OF THE DRAWINGS

FIGS. 2-4 show exemplary operating parameters and operational results of an exemplary version of the invention operating at 5.5 bar Indicated Mean Effective Pressure (IMEP), 2300 RPM, an initial gasoline fuel charge, and a single subsequent diesel fuel charge (with overall fuel being 80% gasoline and 20% diesel fuel by volume), with no EGR, wherein:

FIG. 2 shows unburnt hydrocarbons (HC) and carbon monoxide (CO) emissions versus various crank angles at which Start of Injection (SOI) was set for the subsequent diesel fuel charge, as well as spray penetration settings (i.e., injection pressures) set for these injections;

FIG. 3 shows net indicated specific fuel consumption (ISFC) attained at the crank angles of FIG. 2 for Start of Injection (SOI) of the subsequent diesel fuel charge;

FIG. 4 schematically depicts the stratification between gasoline and diesel fuels for two of the crank angles of FIG. 2 for Start of Injection (SOI) of the subsequent diesel fuel charge.

DETAILED DESCRIPTION OF PREFERRED VERSIONS OF THE INVENTION

Figure 1:
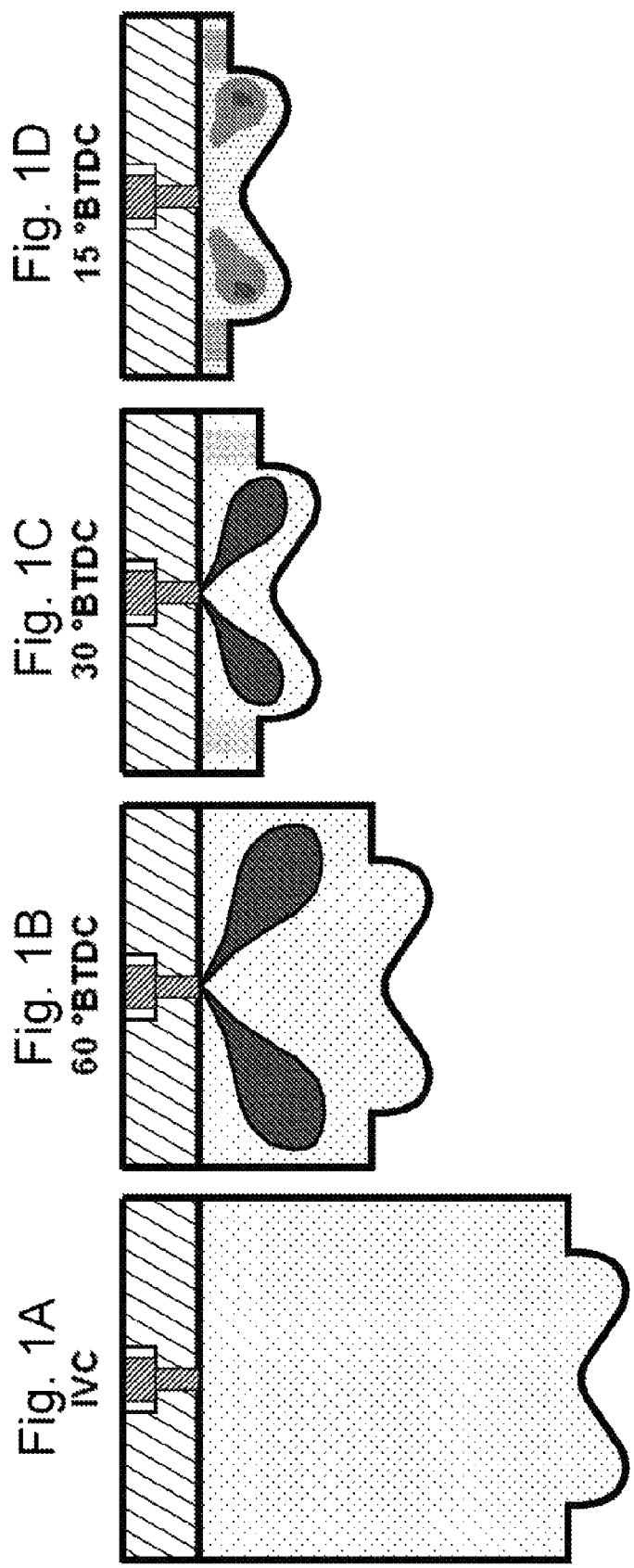
FIGS. 1A-1D schematically illustrate the cross-sectional area of a combustion chamber of a diesel (compression ignition) engine as its piston moves from a position at or near Bottom Dead Center (FIG. 1A) to a position at or near Top Dead Center (FIG. 1D), showing an engine combustion method exemplifying the invention wherein a first low-reactivity fuel charge is already at least substantially homogeneously dispersed within the chamber in FIG. 1A, a first subsequent high-reactivity fuel charge is injected into the chamber in FIG. 1B, and a second subsequent high-reactivity fuel charge is injected into the chamber in FIG. 1C.

Before reviewing the invention further, it is initially useful to discuss the concept of "reactivity" in greater detail. In the context of this document, the term "reactivity" generally corresponds to the cetane number of a substance, and/or the converse of the octane number of a substance. The cetane number measures the speed at which a fuel (or other substance) starts to auto-ignite (spontaneously burn) under diesel operation conditions, i.e., under high pressures and temperatures. In a diesel engine, a fuel with higher reactivity (i.e., higher cetane number) will ignite more quickly than a fuel with lower reactivity. In contrast, the octane number—a measurement usually used for gasoline engine fuels rather than diesel fuels—is a measurement of a substance's resistance to autoignition. In general, diesel fuels have high reactivity (high cetane number/low octane number), and gasolines have low reactivity (low cetane number/high octane number).

As discussed above, the invention configures and times lower and higher reactivity fuel charges to control the start and rate of heat release (the start and duration of combustion)

to attain greater work output. In most current diesel engines designed for greater fuel efficiency and lower emissions, combustion begins during the compression stroke, rapidly escalates (owing to combustion occurring nearly simultaneously throughout the combustion chamber) to peak around Top Dead Center (TDC) and tapers off thereafter. This results in negative work as the expanding combustion gases work against the piston during compression, as well as higher engine noise owing to the rapid pressure rise, and increased fuel consumption. Here, an objective is to provide a stratified fuel reactivity distribution within the combustion chamber—i.e., provide distinct regions of higher and lower fuel reactivity—which has an ignition time and a burn rate resulting in better work output, most preferably with ignition beginning slightly before (or possibly shortly after) TDC, and then burning at a controlled rate so as to provide high work output before the piston moves too far outwardly in the cylinder.

Different engine speed/load conditions will require different combustion timings/durations. For different speed/load conditions, timing of the peak combustion heat release (and thus the peak work input to the piston) can be scheduled for the appropriate time—usually at or soon following top dead center—by appropriately timing and proportioning the amounts of the differing-reactivity charges, thereby attaining the desired start time and duration of heat release. In general, the time of heat release is controlled by the ignitability of the high reactivity region generated from the high reactivity charge, while duration is controlled by the proportions of higher- and lower-reactivity fuels and their distribution within the combustion chamber (with greater stratification leading to slower heat release). If heat release occurs too late, the proportion of the higher-reactivity material can be increased with respect to the lower-reactivity material. If heat release occurs too soon, the opposite approach can be used. As speed/load conditions change, the timings, numbers, net amounts, and ratios of high and low reactivity content of the charges (as well as parameters such as injection pressures, etc.) can be appropriately set by automotive control systems/computers by collecting engine sensor measurements and referencing look-up tables with stored values derived from experimental results, or from simulations; by deriving values from formulae, or from on-the-fly computerized engine simulations; and/or by other means. Neural networks or other expert/learning systems can also be used to learn optimal values for particular speed, load, and other conditions, and to apply these values when appropriate.

Figure 2:
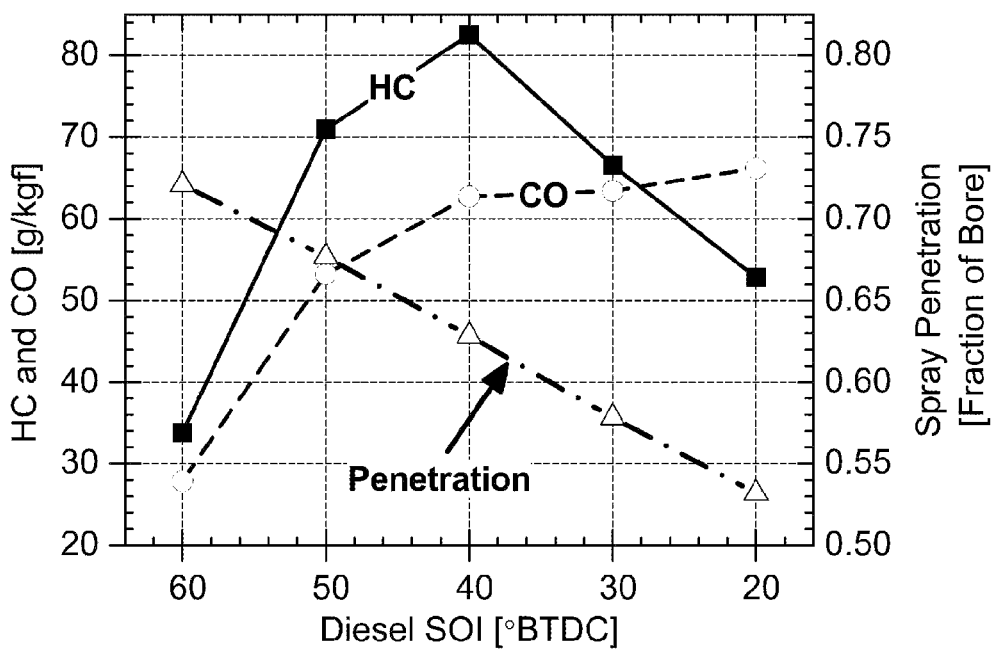
Figure 3:
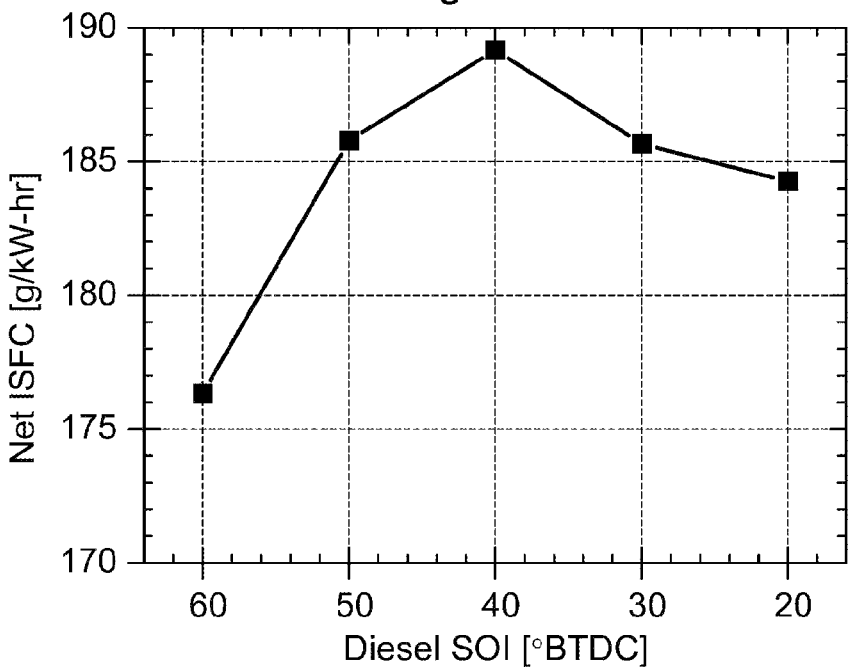

FIGS. 2-4 illustrate exemplary results obtained from a light-duty General Motors diesel engine at the University of Wisconsin-Madison Engine Research Center. A fuel blending and injection strategy using an initial low-reactivity (gasoline) fuel charge and a single subsequent high-reactivity (diesel fuel) fuel charge was first developed by use of computerized engine models which simulated the performance of the engine in question. "Genetic" algorithms, which sought to locate the optimal variables for engine performance (in particular, which sought to attain complete combustion phased to provide maximum work output), were implemented to provide proposed fuel charge amounts, injection timings, and pressures. These were then implemented and fine-tuned on the engine. FIGS. 2 and 3 then show the effect of Start-Of-Injection (SOI) timing on hydrocarbon (HC) and carbon monoxide (CO) emissions (these being a measure of incomplete combustion), and spray penetration at the end of injection (expressed as a fraction of bore diameter). Interestingly, a peak in HC and ISFC, as well as a (rough) plateau in CO, occurred at a SOI of approximately 40 degrees BTDC. For the engine in question—which has a combustion chamber roughly shaped as in FIG. 1—this corresponds to a spray tip penetration of 63% of the bore diameter, which is near the edge of the bowl in the piston. At injection timings later than 40 degrees BTDC, combustion occurs too early in the cycle—CA50 (50% of the heat release) occurs before TDC—leading to increased fuel consumption and NOx emissions (though the high temperatures aid in HC oxidation). However, as injection timing is advanced beyond 40 degrees BTDC, a drastic reduction in HC, CO, and ISFC is observed as the engine enters a new combustion regime wherein the stratification between high-reactivity regions and low-reactivity regions yields more optimally timed combustion (attained when the injected spray tip penetration is greater than approximately 70% of the bore diameter, thereby generating an auto-igniting high-reactivity region in approximately the outer third of the combustion chamber). FIG. 4 provides further detail, illustrating the (calculated) distribution of gasoline and diesel fuel where the high-reactivity fuel charge is injected at 40 and 60 degrees BTDC. For the operating conditions used for the tests, calculations showed that complete combustion is only achieved when the local fuel mixture has below approximately 90% gasoline. At an SOI of 40 degrees BTDC, the diesel fuel does not penetrate into the outer region of the combustion chamber, thus resulting in a highest-reactivity region above the edge of the bowl at which ignition would begin (and would thus seem to spread more rapidly to the remainder of the chamber, owing to the more central location of ignition). However, when the injection timing is advanced to 60 degrees BTDC, the more reactive fuel enters the outer region of the combustion chamber to form an ignition site here, resulting in combustion timing and duration yielding more optimal HC, CO, and ISFC. Further investigation has indicated that very advanced injection timings of greater than 40 degrees BTDC—i.e., injection of at least the first high-reactivity charge at an atypically early time—will generally yield superior results.

It is emphasized that the versions of the invention discussed above are merely exemplary, and the invention can be modified in numerous respects. As one example, the low- and high-reactivity fuel charges are not limited to the use of gasoline and diesel, or to the use of gasoline or diesel with a reactivity-modifying additive, and a wide variety of other fuels (with or without additives) might be used instead. As an example, ethanol is a fuel (or an additive) with low reactivity, even lower than that of gasoline (i.e., a lower cetane number and higher octane number than gasoline), and it might be used for low-reactivity fuel charges along with high-reactivity fuel charges of diesel fuel or gasoline. Also, any of these fuels may be used as a reactivity-modifying additive for any of the other fuels (e.g., diesel fuel can be added to gasoline, ethanol, or a gasoline/ethanol blend to increase its reactivity).

The reactivity of a fuel can also be modified by means other than by the addition of an additive, as by altering a fuel's composition, and/or by separating a fuel into lower- and higher-reactivity components, by use of devices on-board a vehicle for cracking, heating, distilling, and/or catalysis along a vehicle's fuel line. Size, weight, and price factors will naturally bear on the practicality of the use of such devices onboard a vehicle. One compact and relatively cost-efficient option is to use a plasma reactor such as that in U.S. Pat. No. 7,510,632 to Denes et al. along the fuel line. Reactivity can also be effectively modified by use of EGR (Exhaust Gas Recirculation) or similar measures, since recirculated exhaust gas can hinder combustion.

As another exemplary modification, the invention is not limited to the use of only two or three fuel charges, e.g., four or more charges could be used. Further, the invention is not limited to the use of only two levels of reactivity; to illustrate, each of three or more fuel charges may have different reactivity than the other charges. In addition, fuels need not be liquid in form, and gaseous fuels (such as methane/natural gas) might be used. Moreover, the reactivity stratification strategy used in the invention need not be used from cycle to cycle within an engine, e.g., an engine might switch between conventional diesel operation and the modified operation described above.

The invention is also compatible with EGR (Exhaust Gas Recirculation), as noted above, as well as exhaust after-treatment and other combustion manipulation and emissions reduction strategies. These strategies might reduce emissions even further, and since the emissions resulting from the invention are decreased from those in prior systems, the equipment used to implement the strategies might have longer operating life, and/or may be modified for lesser expense.

In summary, the invention is not intended to be limited to the preferred versions of the invention described above, but rather is intended to be limited only by the claims set out below. Thus, the invention encompasses all different versions that fall literally or equivalently within the scope of these claims.

What is claimed is:

1. A compression ignition combustion method for an internal combustion engine, the method including the steps of:
   a. providing an initial fuel charge to a combustion chamber sufficiently prior to Top Dead Center (TDC) that the initial fuel charge is at least substantially homogeneously dispersed within the combustion chamber by a time halfway through a compression stroke;
   b. providing a subsequent fuel charge to the combustion chamber at 40 or more degrees prior to Top Dead Center (TDC):
      (1) wherein the subsequent fuel charge and initial fuel charge have different reactivities, and
      (2) such that the subsequent fuel charge defines a volume within the combustion chamber having different reactivity than the remainder of the combustion chamber; and
   c. compressing the fuel charges until ignition occurs before the subsequent fuel charge can homogeneously disperse within the combustion chamber.

2. The method of claim 1 further including the step of providing exhaust gas from the combustion chamber back to the combustion chamber prior to or during the provision of the initial fuel charge to the combustion chamber.

3. The method of claim 1 wherein ignition results in:
   a. engine net indicated thermal efficiency of greater than 48%, and
   b. engine gross indicated thermal efficiency of greater than 51%.

4. The method of claim 1 wherein combustion products resulting from ignition provide:
   a. NOx emissions of less than 1.0 g/kW-hr, and
   b. soot emissions of less than 0.1 g/kW-hr.

5. The method of claim 1 wherein ignition results in peak cylinder pressure at or after Top Dead Center (TDC).

6. The method of claim 1 wherein ignition results in peak cylinder pressure between 5 and 15 degrees after Top Dead Center (TDC).

7. The method of claim 1 wherein ignition results in CA50 between approximately 0 to 20 degrees after Top Dead Center (TDC).

8. The method of claim 1 wherein:
   a. one of the initial fuel charge and the subsequent fuel charge contains gasoline; and
   b. the other of the initial fuel charge and the subsequent fuel charge contains diesel fuel.

9. The method of claim 1 wherein:
   a. one of the initial fuel charge and the subsequent fuel charge contains a first fuel; and
   b. the other of the initial fuel charge and the subsequent fuel charge contains a mixture of the first fuel and an additive.

10. The method of claim 1:
    a. wherein at least one of the initial and subsequent fuel charges includes a fuel provided to the combustion chamber from a tank, with the tank and the combustion chamber being situated within a vehicle;
    b. further including the step of:
       (1) altering the composition of the fuel between the tank and the combustion chamber to thereby alter the reactivity of the fuel,
       (2) without addition of any additive to the fuel.

11. The method of claim 1 wherein the initial and subsequent fuel charges enter the combustion chamber at different locations.

12. The method of claim 11 wherein:
    a. the initial fuel charge is supplied into the combustion chamber through an intake port;
    b. the subsequent fuel charge is supplied into the combustion chamber via direct injection.

13. The method of claim 1 wherein the initial fuel charge has a lower reactivity than the subsequent fuel charge.

14. The method of claim 1 wherein:
    a. Two or more subsequent fuel changes are supplied into the combustion chamber, and
    b. The subsequent fuel charges are introduced into the combustion chamber at different times.

15. The method of claim 14 wherein the subsequent fuel charges include:
    a. a first subsequent fuel charge provided to the combustion chamber between:
       (1) the closing of an intake port opening onto the combustion chamber, and
       (2) approximately 40 degrees prior to top dead center; and
    b. a second subsequent fuel charge provided to the combustion chamber after the first subsequent fuel charge.

16. The method of claim 14 wherein the subsequent fuel charges include:
    a. a first subsequent fuel charge, wherein at least a major portion of the first subsequent fuel charge is injected toward an outer region located at or near an outer radius of a piston face which partially bounds the combustion chamber;
    b. a second subsequent fuel charge supplied into the combustion chamber after the first subsequent fuel charge, wherein at least a major portion of the second subsequent fuel charge is injected toward an inner region spaced inwardly from the outer radius of the piston face.

17. The method of claim 14 wherein the subsequent fuel charges include:
    a. a first subsequent fuel charge, wherein at least a major portion of the first subsequent fuel charge is injected toward a region located outside of an outer third of the radius of a piston face which partially bounds the combustion chamber;
    b. a second subsequent fuel charge supplied into the combustion chamber after the first subsequent fuel charge, wherein at least a major portion of the second subsequent fuel charge is injected toward a region located inside an outer fourth of the radius of the piston face.

18. A compression ignition combustion method for an internal combustion engine, the method including the steps of:
   a. generating a fuel-air mixture within a combustion chamber wherein the mixture has a stratified distribution of fuel reactivity, with the mixture including:
      (1) an at least substantially homogeneous matrix of air and a first fuel, and
      (2) a second fuel situated within a sub-volume of the matrix, wherein the first and second fuel have different reactivities;
   prior to the latter half of the engine's compression stroke,
   b. compressing the fuel-air mixture until it ignites.

19. The method of claim 18 wherein the fuel-air mixture includes exhaust gas from a previously-ignited fuel-air mixture.

20. The method of claim 18 wherein ignition results in:
   a. engine net indicated thermal efficiency of greater than 48%, and
   b. engine gross indicated thermal efficiency of greater than 51%.

21. The method of claim 18 wherein combustion products resulting from ignition provide:
   a. NOx emissions of less than 1.0 g/kW-hr, and
   b. soot emissions of less than 0.1 g/kW-hr.

22. The method of claim 18 wherein ignition results in peak cylinder pressure at or after Top Dead Center (TDC).

23. The method of claim 18 wherein ignition results in peak cylinder pressure between 5 and 15 degrees after Top Dead Center (TDC).

24. The method of claim 18 wherein ignition results in CA50 between approximately 0 to 20 degrees after Top Dead Center (TDC).

25. The method of claim 18 wherein:
   a. one of the first fuel and the second fuel contains gasoline; and
   b. the other of the first fuel and the second fuel contains diesel fuel.

26. The method of claim 18 wherein:
   a. the first fuel contains the second fuel and an additive, or
   b. the second fuel contains the first fuel and an additive.

27. The method of claim 18 wherein the first and second fuels enter the combustion chamber at different locations.

28. The method of claim 18 wherein the first fuel has a lower reactivity than the second fuel.

29. A compression ignition internal combustion engine including:
   a. a combustion chamber;
   b. a first fuel supply bearing a first combustible material;
   c. a second fuel supply bearing a second combustible material, wherein the first and second combustible materials have different reactivity;
   d. a control system configured to:
      (1) provide an initial fuel charge to the combustion chamber from the first fuel supply prior to the latter half of the engine's compression stroke, to define an at least substantially homogeneous matrix of air and the initial fuel charge within the combustion chamber;
      (2) thereafter provide a subsequent fuel charge to the combustion chamber from the second fuel supply prior to the latter half of the engine's compression stroke, with the subsequent fuel charge defining a volume within the matrix having different reactivity than the remainder of the matrix; and
      (3) compress the matrix until ignition occurs.

30. The engine of claim 29 further including an exhaust system receiving exhaust gas from the combustion chamber, wherein a portion of the exhaust gas from the exhaust system is supplied back to the combustion chamber.

31. The engine of claim 29 wherein ignition provides:
   a. engine net indicated thermal efficiency of greater than 48%, and
   b. engine gross indicated thermal efficiency of greater than 51%.

32. The engine of claim 29 wherein combustion products resulting from ignition provide:
   a. NOx emissions of less than 1.0 g/kW-hr, and
   b. soot emissions of less than 0.1 g/kW-hr.

33. The engine of claim 29 wherein ignition results in peak pressure within the combustion chamber at or after Top Dead Center (TDC).

34. The engine of claim 29 wherein ignition results in peak pressure within the combustion chamber between 5 and 15 degrees after Top Dead Center (TDC).

35. The engine of claim 29 wherein ignition results in CA50 between approximately 0 to 20 degrees after Top Dead Center (TDC).

36. The engine of claim 29 wherein:
   a. one of the initial fuel charge and the subsequent fuel charge contains gasoline; and
   b. the other of the initial fuel charge and the subsequent fuel charge contains diesel fuel.

37. The engine of claim 29 wherein:
   a. one of the initial fuel charge and the subsequent fuel charge contains a first fuel; and
   b. the other of the initial fuel charge and the subsequent fuel charge contains a mixture of the first fuel and an additive.

38. The method of claim 29:
   a. wherein:
      (1) at least one of the first combustible material and the second combustible material include a fuel supplied from a tank;
      (2) the tank and the combustion chamber are situated within a vehicle;
   b. further including the step of:
      (1) altering the composition of the fuel between the tank and the combustion chamber to thereby alter the reactivity of the fuel,
      (2) without addition of any additive to the fuel.

39. The engine of claim 29 wherein the initial and subsequent fuel charges enter the combustion chamber at different locations.

40. The method of claim 39 wherein:
   a. the initial fuel charge enters the combustion chamber through an intake port;
   b. the subsequent fuel charge enters the combustion chamber via an injector.

41. The engine of claim 29 wherein the initial fuel charge has a lower reactivity than the subsequent fuel charge.

42. The engine of claim 29 wherein the control system is configured to provide two or more subsequent fuel charges to the combustion chamber at different times.

43. The engine of claim 42 wherein the subsequent fuel charges include:
   a. a first subsequent fuel charge provided to the combustion chamber following the closing of an intake port opening onto the combustion chamber, and
   b. a second subsequent fuel charge provided to the combustion chamber after the first subsequent fuel charge.

44. The engine of claim 42 wherein the subsequent fuel charges include:
- a. a first subsequent fuel charge, wherein at least a major portion of the first subsequent fuel charge is injected toward an outer region located at or near an outer radius of a piston face which partially bounds the combustion chamber;
- b. a second subsequent fuel charge supplied into the combustion chamber after the first subsequent fuel charge, wherein at least a major portion of the second subsequent fuel charge is injected toward an inner region spaced inwardly from the outer radius of the piston face.

45. The engine of claim 42 wherein the subsequent fuel charges include:
- a. a first subsequent fuel charge, wherein at least a major portion of the first subsequent fuel charge is injected toward a region located outside of an outer third of the radius of a piston face which partially bounds the combustion chamber;
- b. a second subsequent fuel charge supplied into the combustion chamber after the first subsequent fuel charge, wherein at least a major portion of the second subsequent fuel charge is injected toward a region located inside an outer fourth of the radius of the piston face.

* * * * *